Figure 1:
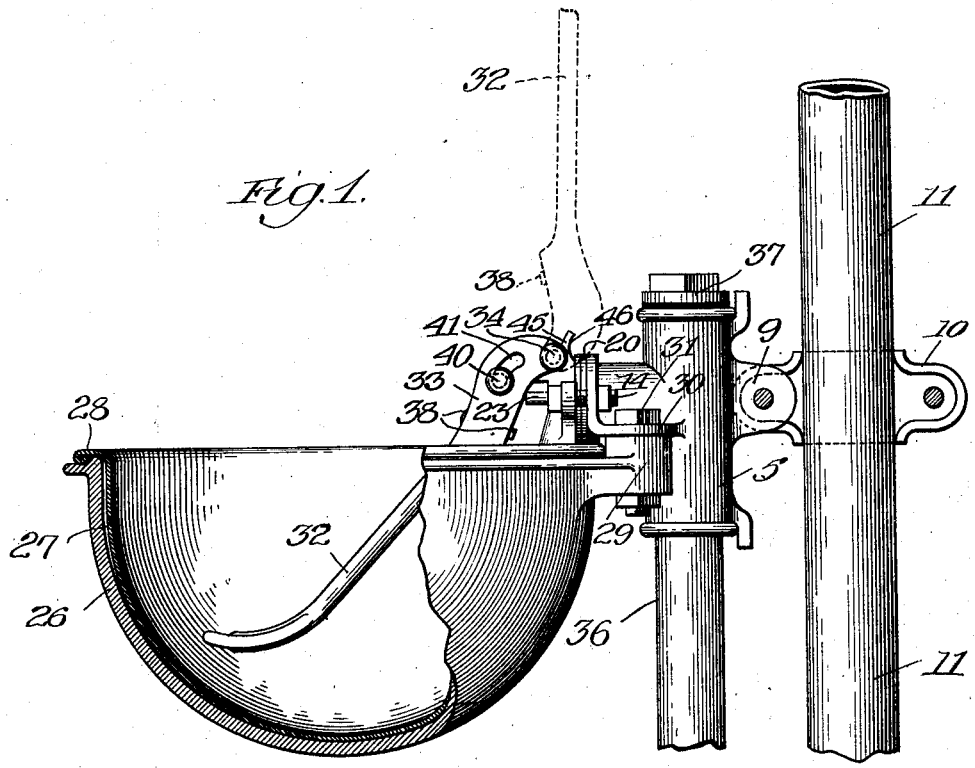

Sept. 2, 1930.  H. L. FERRIS  1,774,876
WATERING DEVICE
Filed Jan. 28, 1928  4 Sheets-Sheet 1

Inventor:
Henry L. Ferris,
By Dyrenforth, Lee, Chritton & Wiles
Attys.

Sept. 2, 1930.                H. L. FERRIS                1,774,876
                            WATERING DEVICE
                        Filed Jan. 28, 1928            4 Sheets-Sheet 2
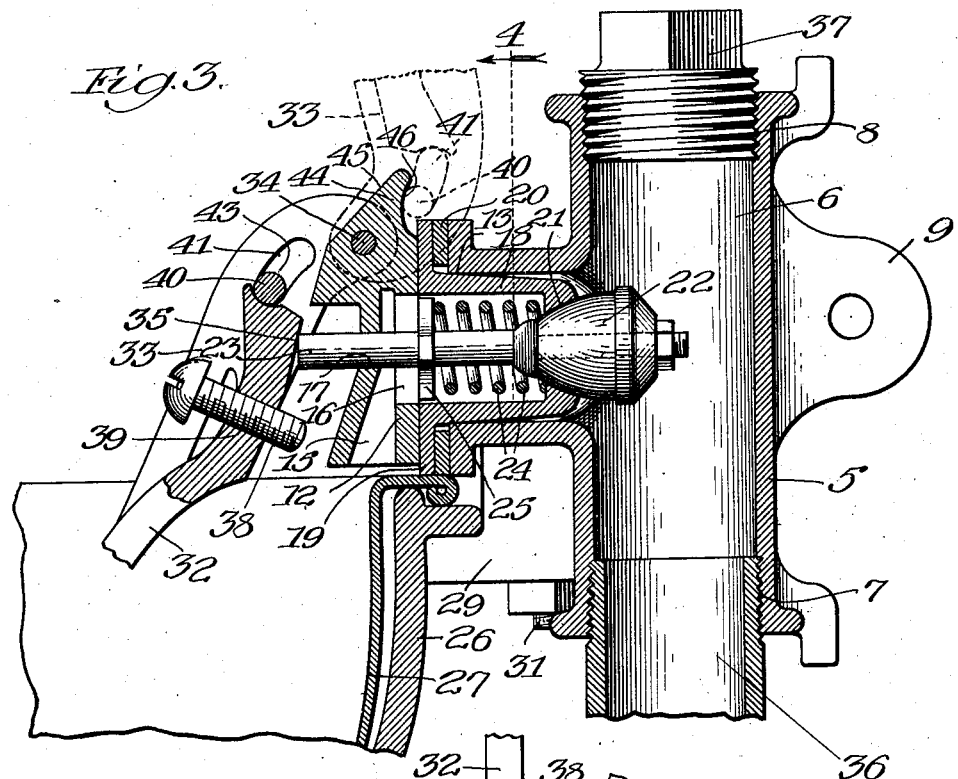
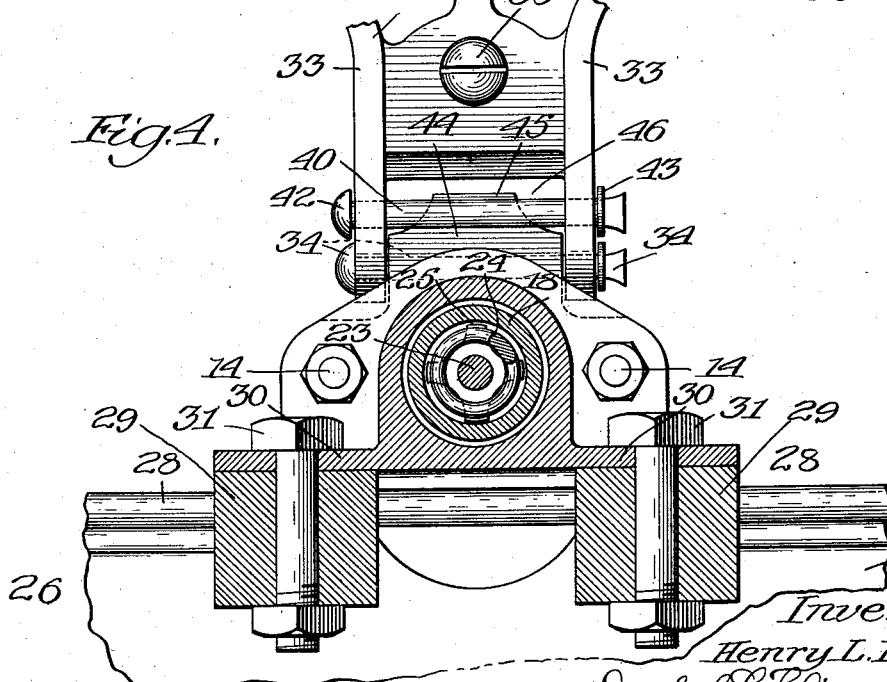

Sept. 2, 1930. H. L. FERRIS 1,774,876
WATERING DEVICE
Filed Jan. 28, 1928 4 Sheets-Sheet 3
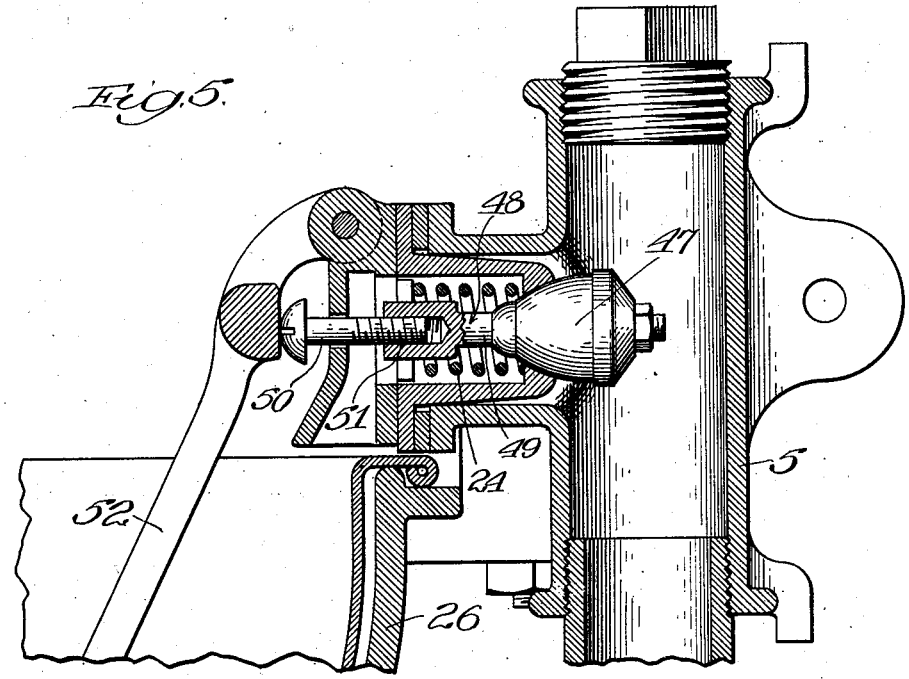
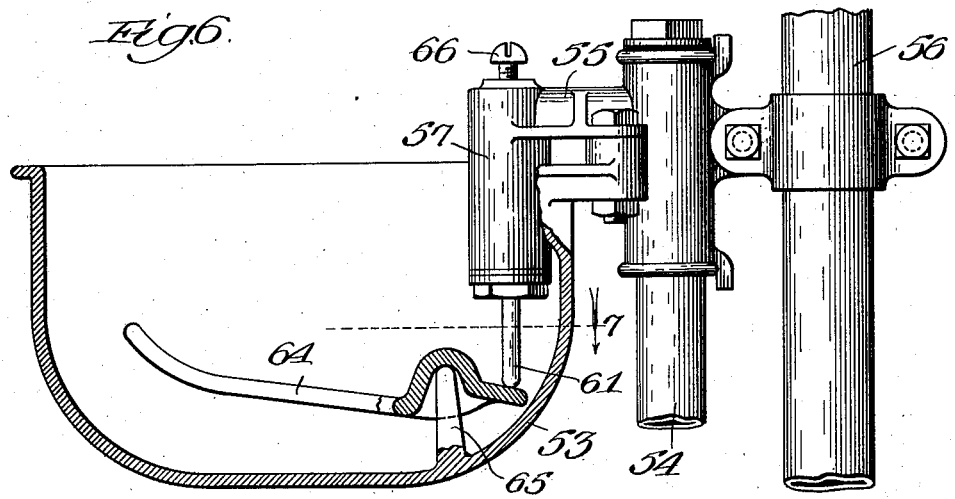
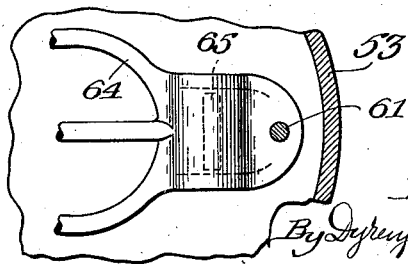
Inventor:
Henry L. Ferris, Sept. 2, 1930.  H. L. FERRIS  1,774,876
WATERING DEVICE
Filed Jan. 28, 1928   4 Sheets-Sheet 4
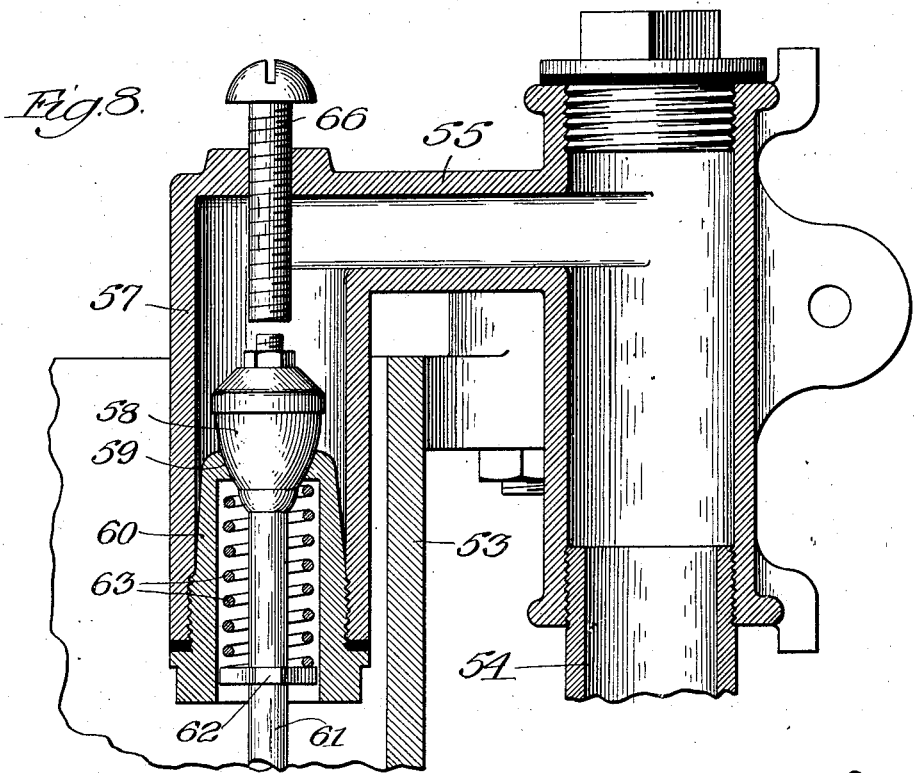
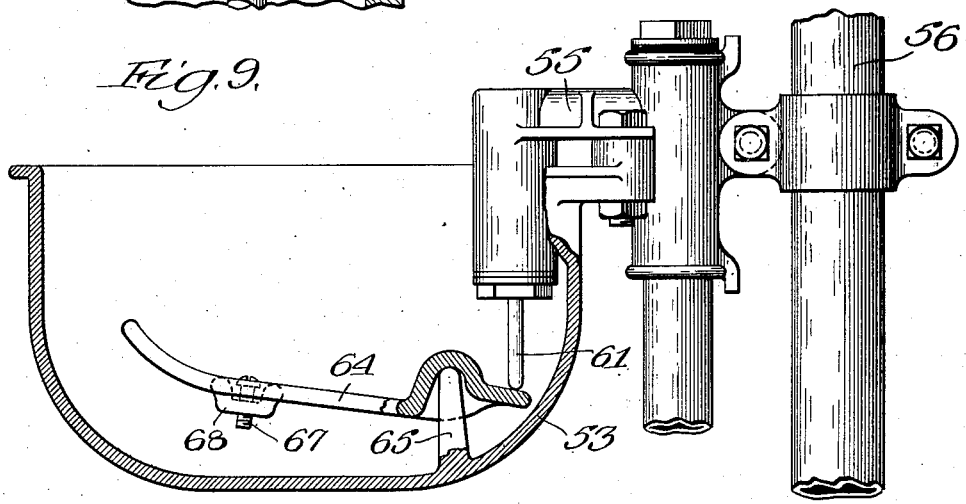
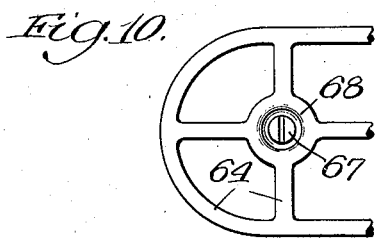
Inventor:
Henry L. Ferris,
By Dyrenforth, Lee, Chritton & Wiles
Attys.

Patented Sept. 2, 1930

1,774,876

UNITED STATES PATENT OFFICE

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS

WATERING DEVICE

Application filed January 28, 1928. Serial No. 250,185.

My invention relates, more particularly, to devices for supplying drinking water to live stock, and especially to that type of device which comprises a water bowl to which the water is supplied responsive to the lowering of the head of the animal into the bowl.

One of the features of my invention relates to the regulation of the force at which the water flows into the bowl, it being desirable to so regulate the flow that the desired amount will be fed to the bowl without washing or driving the water out of the bowl as would occur if the water enters the bowl under excess pressure.

The pressures of the water supplies available for use where devices of this character are to be installed often greatly vary, especially in the case of individual water plants and as watering devices have hitherto been constructed they are not adapted, to properly function, for use with the various water pressures available without requiring the use of expensive pressure reducing mechanisms. Furthermore, it is common practice to connect a series of the watering devices at intervals along a pipe connected at one end with the water supply and as watering devices have hitherto been constructed such an arrangement presents the disadvantage that the flow of water to the various watering devices is not only unequal but as to some of them inadequate due to the progressively decreasing flow of water to each succeeding device of the series due to friction.

One of my objects is to provide a watering device of a construction adapting it when connected with any available supply of water under pressure, for producing the desired flow of water thereto responsive to the lowering of the head of the animal into the bowl.

Another object is to provide a novel, simple and economical construction for producing such result.

Another object is to provide, as a part of the watering device, means for regulating the extent of opening of the valve controlling the supply of water thereto responsive to the lowering of the head of the animal into the bowl of the device, and of a simple and economical construction and readily adjustable to condition the device for use with any available supply of water under pressure.

Another object is to provide novel, simple and economical releasable means for holding, in raised position out of the bowl, the part of the device which in its normal position extends into the bowl and may be forced down by the animal and controls the supplying of water to the bowl, such means being of special advantage when the bowl is provided with a removable lining.

Another object is to provide means for the purpose just stated which are not dependent for their use upon any particular location of the pipe through which the water is supplied to the device; and other objects as will be manifest from the following description.

Referring to the accompanying drawings:—

Figure 2:
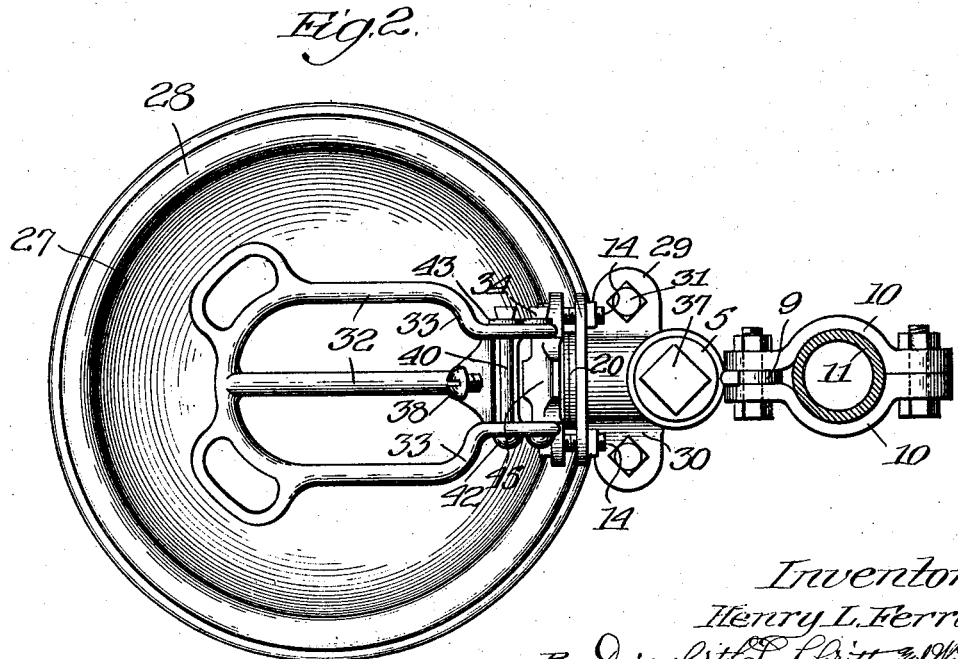

Figure 1 is a view in side elevation, with certain parts broken away, of a watering device installation, the animal depressing member of the device being shown by full lines in operative position and by dotted lines in locked, inoperative, position. Figure 2 is a plan view of the construction shown in Fig. 1 with the water supply pipe and the support for the device shown in section. Figure 3 is an enlarged broken sectional elevational view showing certain details of the device. Figure 4 is a section taken at the line 4 on Fig. 3 and viewed in the direction of the arrow. Figure 5 is a view like Fig. 3 of a modified form of the device. Figure 6 is a similar view of another modification of the device. Figure 7 is a broken sectional view taken at the line 7 on Fig. 6 and viewed in the direction of the arrow. Figure 8 is an enlarged view in sectional elevation of the valve-equipped portion of the device. Figure 9 is a view like Fig. 3 of still another modification of the device, and Figure 10, a broken plan view of the depressible member of the device of Fig. 9.

The particular construction shown in Figs. 1 to 4 inclusive, comprises a fitting 5 comprising a T-pipe coupling the through passage 6 thereof being internally threaded at its upper and lower open ends as represented at 7 and 8, this coupling being shown as provided with an apertured ear 9 extending rearwardly therefrom for engagement with a sectional clip device 10 through the medium of which the fitting is mounted on an upright 11 which may be one of the upright bars of an animal stanchion.

The fitting also comprises a head 12 positioned to extend across the lateral opening 13 in the coupling and held in place by bolts 14. The head 12 contains a downwardly-opening recess 15 the rear wall of which contains an aperture 16 registering with the opening 13, the forward wall of the recess 15 containing a relatively small aperture 17 concentric with the opening 13.

Located in the opening 13 in the coupling is a valve device comprising a cup 18 provided at its outer end with an annular flange 19 which, with a gasket 20, is clamped between the outer end of the wall of the opening 13 of the coupling and the head 12 by the bolts 14. The inner end wall of the cup 18 is apertured as represented at 21 to form a seat for the valve proper 22 of the valve device, the stem 23 of which extends through the opening 16 and slides in the opening 17 in the head 12. A coil spring 24 interposed between the end wall of the cup 18 and a spider-disk 25 rigid on the stem 23 normally holds the valve 22 in closed position against the seat 21.

Mounted on the fitting 5 is a bowl represented at 26 and provided with a relatively light weight removable and replaceable lining 27 formed about its upper edge with an outwardly turned flange 28 at which it overlaps the upper edge of the bowl 26. The bowl 26 is shown as provided with rearwardly-extending lugs 29 at which it is secured to laterally-extending flanges 30 on the fitting 5, as by bolts 31.

The device also comprises a member represented at 32 which in normal position extends into the bowl and is depressed into a position in which it opens the valve 22, by the animal in lowering its head into the bowl as it drinks the water therefrom. The member 32 is shown as in the form of an openwork frame pivotally connected at the upper ends of its side members 33 with a pin 34 mounted in the head 12, the various parts of the device being so constructed and arranged as shown that in the normal position thereof the member 32 bears at a solid portion 35 thereof against the outer end of the stem 23, and when the animal pushes down on the lower end of the member 32, the valve 22 is forced to open position against the action of the spring 24.

In practice the pipe for conducting the water to the coupling 5 for discharge into the bowl, would be connected with either the upper or lower end of the coupling and the other end thereof plugged. In the arrangement shown the water conducting pipe represented at 36 is screwed into the upper end of the coupling and the lower end thereof is closed by the plug represented at 37, it being understood from the foregoing description that when the animal depresses the member 32 to open the valve 22 water is supplied to the bowl, the valve 22 automatically closing as the animal lifts its head responsive to the rising level of the water in the bowl.

In accordance with one feature of my invention the device is provided with adjustable means operating to regulate the extent to which the valve 22 is opened by the member 32, to prevent undue rush of water into the bowl, these means comprising a set screw 38 screwed into an opening 39 in the member 32 and positioned to abut at its inner end against the head 12 when the member 32 is depressed. By adjusting the screw 38 which forms a stop, the extent of opening of the valve 22 may be accurately regulated thereby adapting the water device for use with greatly varying water pressures to produce the desired flow of water to the bowl and with the avoidance of objectionable washing of the water out of the bowl.

Furthermore, the provision of each watering device with valve controlling means as stated is of advantage where a number of the watering devices are provided in a series and connected at intervals along a feed pipe in communication at one end with a water supply, as thereby equal feeding of the water to all of the watering devices may be effected.

It is desirable, in devices of this character, to provide for the releasable locking of the member 32 in raised position to prevent the opening of the valve by the animal, as for example when it is desired that no water be supplied to it, or, in connection with the particular illustrated construction, that no water be permitted to enter the bowl proper 26 when the lining 27 has been removed therefrom as for cleansing the latter.

In accordance with my invention the device is provided with such releasable locking means which according to the preferred illustrated embodiment thereof comprise a pin 40 extending at its ends through arcuate slots 41 in the side members 33 of the member 32, one outer end of this pin being headed as represented at 42 and its other end provided with a washer 43 fixed thereon to prevent longitudinal displacement of the pin. These locking means also comprise a keeper on the head 12 and shown as in the form of an upwardly extending lug 44 thereon with its forward face inclined as represented at 45 and its rear face dished as represented at 46, the pin 40 and keeper 44 being so positioned that in the swinging of the member 32 to the dotted position shown in Figs. 1 and 3, the pin 40 rides against the inclined surface 45 and drops back of the keeper 44 to the dotted position shown in Fig. 3 in which position it is retained until the operator upon lifting the pin 40 to a position in which it clears the top of the lug 44, swings the member 32 forwardly.

Among the advantages presented by the provision of the releasable locking means as shown and described is that by providing the keeper 44 on the fitting, the pipe for conducting the water to the watering device may be connected with any part of the fitting as desired and as local conditions may render advisable or necessary.

Figs. 5 to 9, inclusive, illustrate certain modifications which may be made in the means for controlling the extent to which the water-valve may be opened by the animal in lowering its head into the bowl, with the advantages above pointed out in connection with the mechanism provided for this purpose in the construction illustrated in Figs. 1 to 4, inclusive.

Referring to the construction shown in Fig. 5 this device, instead of providing an adjustable member on the member 32 which engages a part of the fitting to limit the extent to which the valve is opened, provides as an adjustable part, that part of the valve stem which is abutted by the depressible member 32. In this construction the arrangement of the parts is substantially the same as in the device of the preceding figures except for the change in the means which limit the extent of opening of the valve and the omission of the means for interlocking the depressible member with the fitting in the raised position of said member.

In this construction the valve device, corresponding to the valve device 22 of the preceding figures, and represented at 47 has its valve stem 48 formed of two sections 49 and 50, the valve 47 being directly connected with the section 49. The outer end of the section 49 contains an internally threaded socket 51 in which the threaded inner end of the stem-section 50, which may be in the form of a machine screw, is threaded for adjustment to vary the effective length of the valve stem 48, the outer end of the stem-section 50 extending into the path of downward swinging movement of the depressible pivoted member represented at 52 and corresponding with the member 32 of the preceding construction, it being understood that the spring 24 of the valve structure maintains the member 52 in raised position corresponding with the position of the member 32 in Fig. 1 as shown by full lines therein.

By adjusting the stem-section 50 to lengthen or shorten the valve stem, and thereby the position of the head of the stem section 50 relative to the portion of the fitting through which it extends and which latter forms a stop-surface for said head the extent to which the valve 47 is opened by the act of the animal in forcing the member 52 down in the bowl may be regulated.

Referring to Figs. 6, 7 and 8, the device therein shown comprises a bowl 53 to which the water is fed from a pipe 54 through a fitting 55 connected with the pipe 54 and supporting the bowl 53, the fitting 55 being shown as connected with an upright support 56 which may be a stanchion. The fitting 55 is formed with a tubular portion 57 which depends into the bowl 53 and is equipped with a valve device comprising a reciprocable valve 58 cooperating with a seat 59 provided on an apertured cup member 60 screwed upwardly into the lower open end of the part 57. The valve also comprises a stem 61 which projects downwardly into the bowl 53 and carries a spider disk 62 between which and the upper portion of the cup 60 a coil spring 63 surrounding the stem 61, extends, this spring normally seating the valve 58.

The device also comprises a member 64 mounted in the bowl to be depressed at its forward end by the animal in lowering its head into the bowl. The member 64 is shown as fulcrumed near its rear end on a lug 65 rising from the bottom of the bowl, the rear, short, end of the member 64 bearing upwardly against the lower end of the stem 61, the spring 63 normally holding the member 64 in the position shown in Fig. 6.

In this construction the extent to which the valve 58 may be opened is controlled by an adjustable abutment for the valve, shown as in the form of a machine screw 66 threaded in the upper portion of the fitting 55 to extend into the path of upward movement of the valve 58, it being understood that by adjusting the member 66 in the fitting the extent to which the valve is opened may be accurately controlled.

The construction shown in Figs. 9 and 10 is the same as that shown in Figs. 6, 7 and 8 except that the adjustable member 66 is omitted and the means by which the extent of opening of the valve 58 is controlled comprises an adjustable device shown as in the form of a machine screw 67 carried by the depressible member 64 at a countersunk portion 68 thereof and serving to limit downward rocking of the member 64 and consequently the extent to which the valve 58 is opened, by the engagement of this screw with the bottom of the bowl, it being understood that by adjusting the screw 67 on the member 64 the extent to which the valve 58 is opened may be accurately controlled.

While I have illustrated and described certain particular constructions embodying my invention, I do not wish to be understood as intending to limit it thereto as the same may be variously modified and altered and the invention provided in other forms without departing from the spirit of my invention.

What I claim as new, and desire to secure by Letters Patent, is:

1. In combination, a water bowl, a water pipe, a tubular fitting supporting said bowl and communicating with said pipe and through which water is supplied to said bowl, a valve controlling the flow of water to said bowl, an animal-operated member for operating said valve movable into and out of a position in which it extends into said bowl, and releasable means for holding said member in a position in which it is out of said bowl formed of cooperating portions of said member and said fitting.

2. In combination, a water-bowl, a water pipe, a tubular fitting supporting said bowl and adapted for connection at either its upper or lower end with a water pipe and connected at one of said ends with said pipe and through which water is supplied to said bowl, a valve controlling the flow of water to said bowl, an animal-operated member for operating said valve, and releasable means for holding said member in non-operable position formed of cooperating portions of said member and said fitting.

3. In combination, a water-bowl, means for supplying water thereto, a valve controlling the flow of water to said bowl, an animal-operated member for opening said valve, and releasable means for holding said member in non-operable position comprising a keeper and a locking element automatically engaging said keeper upon moving said member to non-operable position.

4. In combination, a water-bowl, means for supplying water thereto, a valve controlling the flow of water to said bowl, an animal-operated member for opening said valve, and releasable means for holding said member in non-operable position comprising a keeper and a locking element operating automatically to drop into engagement with said keeper upon moving said member to non-operable position.

5. In combination, a water-bowl, means for supplying water thereto, a valve controlling the flow of water to said bowl, an animal-operated member for opening said valve, and releasable means for holding said member in non-operable position comprising a keeper and a movably supported locking bar automatically engaging said keeper upon moving said member to non-operable position.

6. In combination, a water-bowl, means for supplying water thereto, a valve controlling the flow of water to said bowl, an animal-operated member for opening said valve, and releasable means for holding said member in non-operable position comprising a stationarily supported upwardly extending lug and a locking pin movably supported on said member and adapted to ride over and interlock with said lug in the movement of said member to non-operable position.

7. In combination, a water-bowl, a water pipe, a tubular fitting supporting said bowl and adapted for connection at either its upper or lower end with a water pipe and connected at one of said ends with said pipe and through which water is supplied to said bowl, a valve controlling the flow of water to said bowl, an animal-operated member for operating said valve movable into and out of a position in which it extends into said bowl, and releasable means for holding said member in non-operable position formed of cooperating portions of said member and said fitting.

8. In combination, a water-bowl, means for supplying water thereto, a valve controlling the flow of water to said bowl, an animal-operated member for opening said valve movable into and out of a position in which it extends into said bowl, and releasable means for holding said member in a position outside of said bowl comprising a keeper and a locking element automatically engaging said keeper upon moving said member to said last-named position.

9. In combination, a water-bowl, means for supplying water thereto, a valve controlling the flow of water to said bowl, an animal-operated member for opening said valve movable into and out of a position in which it extends into said bowl, and releasable means for holding said member in a position outside of said bowl comprising a keeper and a locking element operating automatically to drop into engagement with said keeper upon moving said member to said last-named position.

10. In combination, a water-bowl, means for supplying water thereto, a valve controlling the flow of water to said bowl, an animal-operated member for opening said valve movable into and out of a position in which it extends into said bowl, and releasable means for holding said member in a position in which it is outside of said bowl comprising a keeper and a movably supported locking bar automatically engaging said keeper upon moving said member to said last-named position.

11. In combination, a water-bowl, means for supplying water thereto, a valve controlling the flow of water to said bowl, an animal-operated member for opening said valve movable into and out of a position in which it extends into said bowl, and releasable means for holding said member in a position in which it is outside of said bowl comprising a stationarily supported upwardly extending lug and a locking pin movably supported on said member and adapted to ride over and interlock with said lug in the movement of said member to said last-named position.

HENRY L. FERRIS.